United States Patent
Jacobs et al.

(10) Patent No.: US 9,001,427 B2
(45) Date of Patent: Apr. 7, 2015

(54) CUSTOMIZED HEAD-MOUNTED DISPLAY DEVICE

(75) Inventors: Joel Jacobs, Seattle, WA (US); Elmer Cajigas, Sammamish, WA (US); Nicolas Denhez, Seattle, WA (US); Paul Bosveld, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 13/484,024

(22) Filed: May 30, 2012

(65) Prior Publication Data

US 2013/0321925 A1     Dec. 5, 2013

(51) Int. Cl.
G02B 27/01     (2006.01)

(52) U.S. Cl.
CPC .......... *G02B 27/017* (2013.01); *G02B 27/0176* (2013.01); *G02B 2027/014* (2013.01); *G02B 2027/0178* (2013.01); *G02B 2027/0187* (2013.01); *Y10T 29/49826* (2015.01)

(58) Field of Classification Search
USPC ................................................. 359/630–634
See application file for complete search history.

(56) References Cited

U.S. PATENT DOCUMENTS

| | | | |
|---|---|---|---|
| 5,151,722 A | 9/1992 | Massof et al. | |
| 5,347,655 A | 9/1994 | Garrett | |
| 5,539,422 A * | 7/1996 | Heacock et al. | 345/8 |
| 6,095,650 A | 8/2000 | Gao et al. | |
| 6,581,430 B2 | 6/2003 | Wilson | |
| 6,719,425 B2 | 4/2004 | Conner | |
| 7,145,726 B2 | 12/2006 | Geist | |
| 7,175,270 B2 | 2/2007 | Curci et al. | |
| 7,210,776 B2 | 5/2007 | Jannard et al. | |
| 8,032,947 B1 | 10/2011 | Gait | |
| 2006/0176242 A1 | 8/2006 | Jaramaz et al. | |
| 2007/0091447 A1 | 4/2007 | Inoguchi | |
| 2008/0088936 A1 | 4/2008 | Tang et al. | |
| 2008/0106489 A1 | 5/2008 | Brown et al. | |
| 2009/0174860 A1 | 7/2009 | Lam et al. | |
| 2010/0315720 A1 | 12/2010 | Filipovich et al. | |
| 2011/0051074 A1 | 3/2011 | Arnell | |
| 2011/0241975 A1 | 10/2011 | Mukawa et al. | |
| 2011/0273665 A1 | 11/2011 | Saffra | |

(Continued)

OTHER PUBLICATIONS

Friedrich, Wolfgang, "Arvika—Augmented Reality for Development, Production and Service", Retrieved at <<http://citeseerx.ist.psu.edu/viewdoc/download?doi=10.1.1.194.6733&rep=rep1&type=pdf>>, International Symposium on Mixed and Augmented Reality, 2002, pp. 3-4.

(Continued)

*Primary Examiner* — Joseph P Martinez
(74) *Attorney, Agent, or Firm* — Jeremy Snodgrass; Judy Yee; Micky Minhas

(57) ABSTRACT

A head-mounted display device includes a modular frame assembly including one or more different components. Each of the different components may be selected from a component set including at least two or more differently-sized versions of each different component. The head-mounted display device also includes a modular see-through display sub-assembly including one or more mountings for selectably coupling the modular see-through display sub-assembly to the modular frame assembly. The modular see-through display sub-assembly may be configured to couple to any combination of differently-sized versions of different components of the modular frame assembly.

20 Claims, 14 Drawing Sheets

(56) References Cited

U.S. PATENT DOCUMENTS

2011/0283445 A1 11/2011 Stiff
2013/0322683 A1 12/2013 Jacobs

OTHER PUBLICATIONS

Drascic, et al., "Perceptual Issues in Augmented Reality", Retrieved at <<http://citeseerx.ist.psu.edu/viewdoc/download?doi=10.1.1.27.5939&rep=rep1&type=pdf>>, Stereoscopic Displays and Virtual Reality Systems III, San Jose, California, Feb. 1996, pp. 123-134.

Fuhrmann, et al., "Fast Calibration for Augmented Reality", Retrieved at <<http://citeseerx.ist.psu.edu/viewdoc/download-?doi=10.1.1.43.1013&rep=rep1&type=pdf>>, ACM symposium on Virtual reality software and technology, 1999, pp. 166-167.

Bayer, et al., "Introduction to Helmet-Mounted Displays", Retrieved at <<http://www.usaarl.army.mil/publications/HMD_Book09/files/Section%209%20-%20Chapter%203%20Introduction%20to%20Helmet-Mounted%20Displays.pdf>>, Helmet-mounted displays: sensation, perception, and cognitive issues, US, 2009, pp. 47-108.

\* cited by examiner

CUSTOMIZED HEAD-MOUNTED DISPLAY DEVICE

BACKGROUND

Some augmented reality devices may display virtual objects via see-through displays. Because such augmented reality devices overlay the virtual images on real objects in a user's field of view, the display devices need to be precisely aligned with the user's eyes to deliver accurate images and prevent user discomfort. However, given that eye size and location, head size, and other facial features vary widely from user to user, these display devices lose accuracy when assembled according to a "one-size fits most" approach.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments for a customized head-mounted display device are provided. In one example embodiment, a head-mounted display device includes a modular frame assembly including one or more different components. Each of the different components may be selected from a component set including at least two or more differently-sized versions of each different component. The head-mounted display device also includes a modular see-through display sub-assembly including one or more mountings for selectably coupling the modular see-through display sub-assembly to the modular frame assembly. The modular see-through display sub-assembly may be configured to couple to any combination of differently-sized versions of different components of the modular frame assembly.

DETAILED DESCRIPTION

Head-mounted display (HMD) devices in accordance with the present disclosure are configured to present images on a see-through display in order to provide an augmented reality experience for a user. Because the augmented reality experience does not block out real objects in the user's field of view, HMD devices may be designed to precisely align the see-through display with the user's eyes in order to align virtual images with real objects. Further, the frames of the HMD device on which the see-through display is mounted may be configured to maintain the see-through display in a desired position, regardless of movement of the user's head.

To provide a desired fit for each user, each HMD device may be customized to accommodate fit points of a respective user. The fit points of the user as well as an interpupillary distance of the user may be obtained prior to final configuration of the HMD device. Based on these measurements, the see-through display module and frames of the HMD device may be selected from a plurality of differently-sized stock components to closely accommodate the user's measurements. The frames may be additionally customized by fine adjustments and/or manufactured from scratch to provide sizing points of the frames that match the user's fit points. External componentry, such as audio components and control circuits, may be coupled to the device after assembly, or may be integrated into the frames and/or see-through display module.

Figure 1:
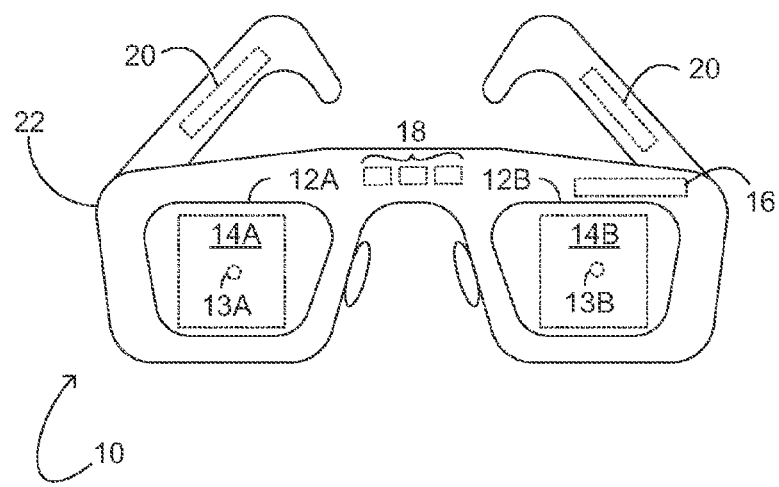
FIG. 1 schematically shows an example head-mounted display device according to an embodiment of the present disclosure.

FIG. 1 shows an example HMD device 10. HMD device 10 may closely resemble an ordinary pair of eyeglasses or sunglasses, and includes a modular see-through display having a right-eye see-through display 12A and a left-eye see-through display 12B. The modular see-through display includes imaging panels 14A and 14B. Imaging panel 14A is arranged in front of the right eye; imaging panel 14B is arranged in front of the left eye. Each imaging panel may include an exit pupil configured to be substantially aligned with a user's pupil when the HMD device is worn by the user. Thus, imaging panel 14A includes exit pupil 13A and imaging panel 14B includes exit pupil 13B. Each exit pupil is depicted as a dashed circle.

HMD device 10 also includes a wearable mount, otherwise referred to as frame 22, which positions the imaging panels a short distance in front of the wearer's eyes. The HMD device also includes a control sub-system 16, a plurality of sensors 18, and an audio sub-system 20. The control sub-system 16 may include a microcomputer, such as a printed circuit board assembly or flex circuit, operatively coupled to both imaging panels, to the sensors, and to audio sub-system 20. In the embodiment of FIG. 1, the wearable mount takes the form of eyeglass frames.

Sensors 18 may be arranged in any suitable location in HMD device 10. They may include a gyroscope, accelerometer, or other inertial sensor, a global-positioning system (GPS) receiver, and/or a barometric pressure sensor configured for altimetry. These sensors may provide data on the wearer's location or orientation. From the integrated responses of the sensors, control sub-system 16 may track the movement of the HMD device within the wearer's environment.

In one embodiment, sensors 18 may include an eye-tracker—i.e., a sensor configured to detect an ocular state of the wearer of HMD device 10. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used for placement of a computer-generated display image, for example.

Audio sub-system 20 may include a suitable speaker system suspended from, attached separately to, or integrated directly into frame 22 in locations configured to be near each ear of the user.

In the illustrated embodiment, each imaging panel 14 is at least partly transparent, to provide a substantially unobstructed field of view in which the wearer can directly observe his physical surroundings. Each imaging panel is configured to present, in the same field of view, a computer-generated display image. Control sub-system 16 may control the internal componentry of imaging panels 14A and 14B in order to form the desired display images. In one embodiment, control sub-system 16 may cause imaging panels 14A and 14B to display the same image concurrently, so that the wearer's right and left eyes receive the same image at the same time. In another embodiment, the imaging panels may project somewhat different images concurrently, so that the wearer perceives a stereoscopic, i.e., three-dimensional image. In one scenario, the computer-generated display image and various real images of objects sighted through an imaging panel may occupy different focal planes. Accordingly, the wearer observing a real-world object may have to shift his or her corneal focus in order to resolve the display image. In other scenarios, the display image and at least one real image may share a common focal plane.

In the HMD devices disclosed herein, sensors 18 may also be configured to acquire video of the surroundings sighted by the wearer. The video may include depth video. It may be used to establish the wearer's location, what the wearer sees, etc. The video acquired by the sensors may be received in control sub-system 16, and the control sub-system 16 may be configured to process the video received. To this end, sensors 18 may include a camera. The optical axis of the camera may be aligned parallel to a line of sight of the wearer of the HMD device, such that the camera acquires video of the external imagery sighted by the wearer. The video acquired may comprise a time-resolved sequence of images of spatial resolution and frame rate suitable for the purposes set forth herein. As the HMD device may include two imaging panels—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

No aspect of FIG. 1 is intended to be limiting in any sense, for numerous variants are contemplated as well. In some embodiments, for example, a vision system integrated with imaging panels 14 may be used to acquire video of what the wearer sees. In some embodiments, a binocular imaging panel extending over both eyes may be used instead of the monocular imaging panel shown in the drawings. Likewise, an HMD device may include a binocular eye tracker. In some embodiments, an eye tracker and imaging panel may be integrated together, and may share one or more optics.

The HMD devices disclosed herein may be used to support a virtual-reality (VR) or augmented-reality (AR) environment for one or more participants. A realistic AR experience may be achieved with each AR participant viewing his environment naturally, through passive optics of the HMD device. Computer-generated imagery, meanwhile, may be projected into the same field of view in which the real-world imagery is received. Imagery from both sources may appear to share the same physical space. Furthermore, the control sub-system in the HMD device may be configured to run one or more computer programs that support the VR or AR environment. In some embodiments, some computer programs may run on an HMD device, and others may run on an external computer accessible to the HMD device via one or more wired or wireless communication links. Accordingly, the HMD device may include suitable wireless componentry, such as Wi-Fi.

Figure 2:
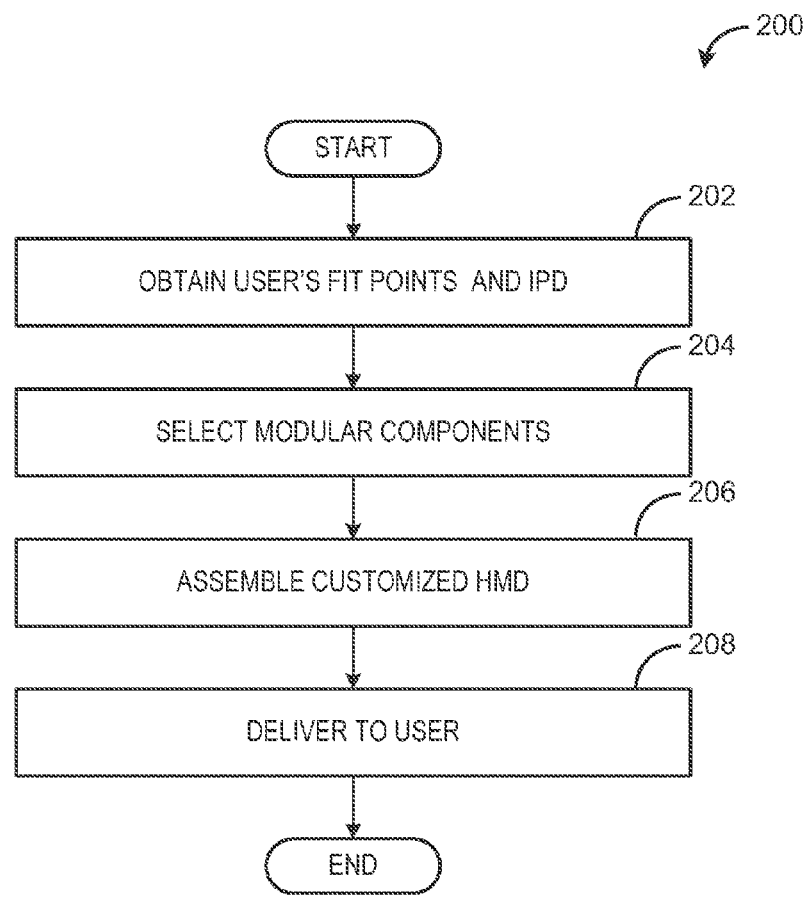
FIG. 2 is a flow chart illustrating a method for creating a customized head-mounted display device according to an embodiment of the present disclosure.

FIG. 2 illustrates a method 200 for creating a customized HMD device, such as HMD device 10, according to an embodiment of the present disclosure. As explained above with respect to FIG. 1, the HMD device may include a see-through display, a frame, and additional components such as sensors and a controller. Creating an HMD device that is customized for a specific user may include customizing the see-through display in order to align exit pupils of the see-through display with pupils of the user, and customizing the frames to minimize movement of the see-through display.

Method 200 includes, at 202, obtaining a plurality of fit points and an interpupillary distance (IPD) of a user. As will be described in more detail below with respect to FIG. 3, the user's fit points may define measurements of various facial features that interact with and define how the HMD device fits on the user. For example, the fit points may include a head circumference, a location of the bridge of the nose, and locations of each ear of the user, and the location of each pupil relative to other fit points. The IPD is the distance between the center points of the pupils of the user. The fit points and IPD of the user may be obtained by a retail distributor of HMD devices, for example when the user orders a customized device, or may be obtained by the user and sent to the producer of the HMD device. Additional detail regarding obtaining fit points and an IPD of a user will be presented below with respect to FIGS. 3-7.

At 204, method 200 includes selecting modular components of the HMD device. Each component of the HMD device may be selected from a plurality of differently-sized components to closely accommodate the user fit points and IPD. The modular components of the HMD device may include imaging panels, such as the imaging panels 14 described above with respect to FIG. 1, incorporated into a see-through display sub-assembly. The see-through display sub-assembly may include a right-eye module and a left-eye module, each containing an imaging panel, as depicted in FIG. 1. In some embodiments, the right-eye and left-eye modules may be integrated in a single piece, or may be separate and coupled via an external component, such as a brow bar.

The modular components may further include a frame assembly, such as frame 22 of FIG. 1, which may be coupled to the see-through display sub-assembly. The frame assembly is configured to be worn by the user and hold the see-through display in a defined position relative to the user. For example, the frame assembly may be coupled to the see-through display sub-assembly in such a manner that exit pupils of the see-though display are substantially aligned with the user's pupils when the HMD device is worn by the user. Additional modular components of the HMD device may include an audio sub-system, control sub-system, optical sensors, and fit components. Additional detail regarding selecting modular components of the HMD device will be presented below with respect to FIGS. 8-11.

At 206, method 200 includes assembling the customized HMD device. Assembling the HMD device may include coupling the components selected at 204 together in a desired configuration. In some embodiments, assembling the HMD device may include selecting a subset of components, such as the see-through display, that closely match the user's measurements, customizing the frames to provide a near-exact match to the user's measurements, and then coupling the selected components to the customized frames. Additional detail regarding assembling the customized HMD device will be provided below with respect to FIGS. 12-15. At 208, the customized HMD device is delivered to the user.

Figure 3:
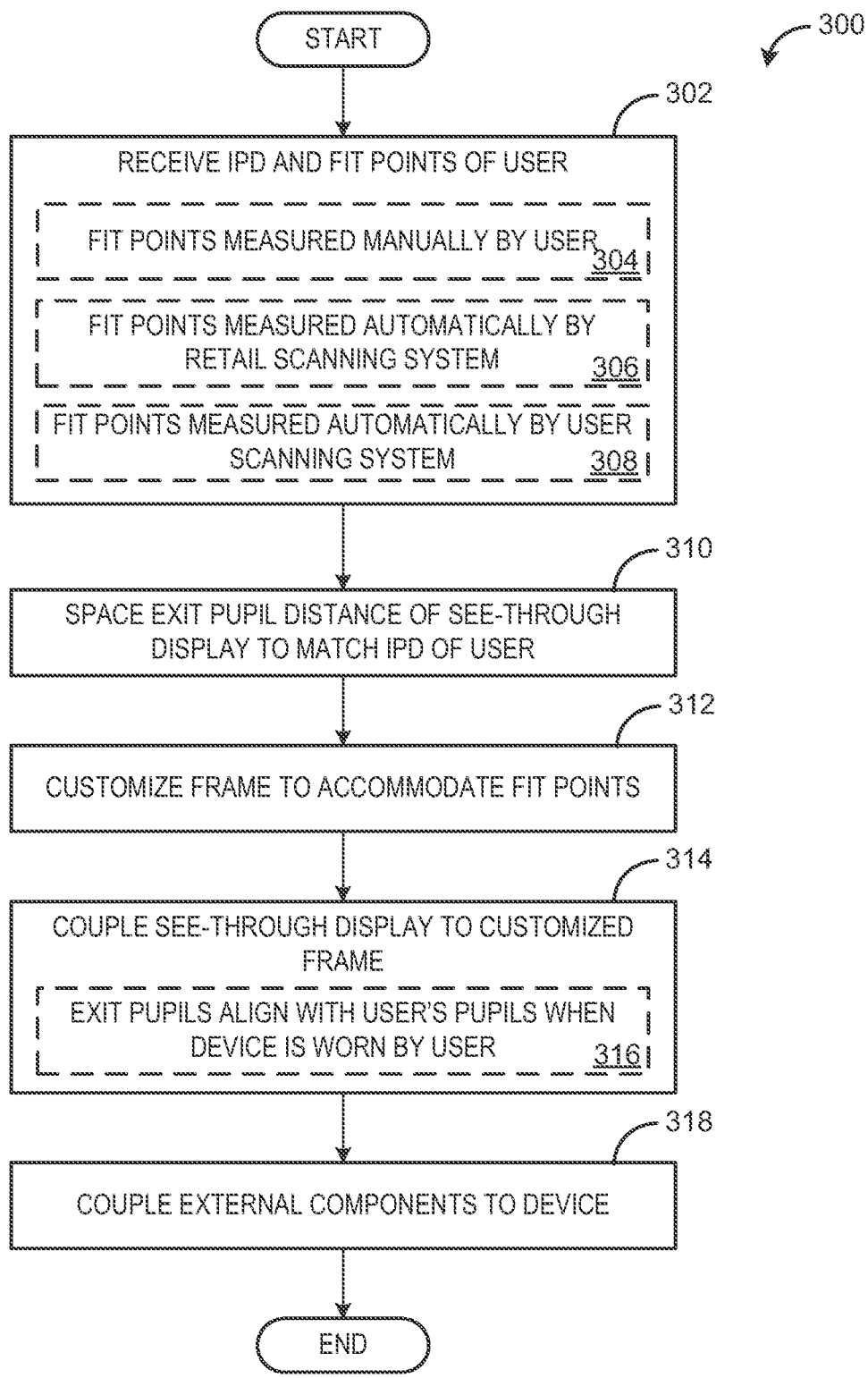
FIG. 3 is a flow chart illustrating a method for obtaining a user fit profile according to an embodiment of the present disclosure.

Thus, method 200 of FIG. 2 provides for mass customization of HMD devices, such that each HMD device may be sized for a specific user while producing the HMD devices on a large scale. In order to customize an HMD device for a specific user, fit points of the user are obtained from measurements of the user's head, and the fit points utilized during the customization of the HMD device. FIG. 3 is a flow chart illustrating a method 300 for obtaining fit points of a user according to an embodiment of the present disclosure.

At 302, method 300 includes receiving a fit profile of a user, which includes a plurality of fit points and an interpupillary distance (IPD) of the user. The fit points of the user may define one or more of a head length, a head width, a head circumference, an ear-to-eye distance, an eye-to-back of head distance, an ear-to-occipital distance of the user, and the location of each pupil relative to one or more other fit points. Additionally, the fit points may define a location of an ear of the user, a location of a nose of the user, etc. Other user head measurements are within the scope of this disclosure.

Figures 4A, 4B, 4C:
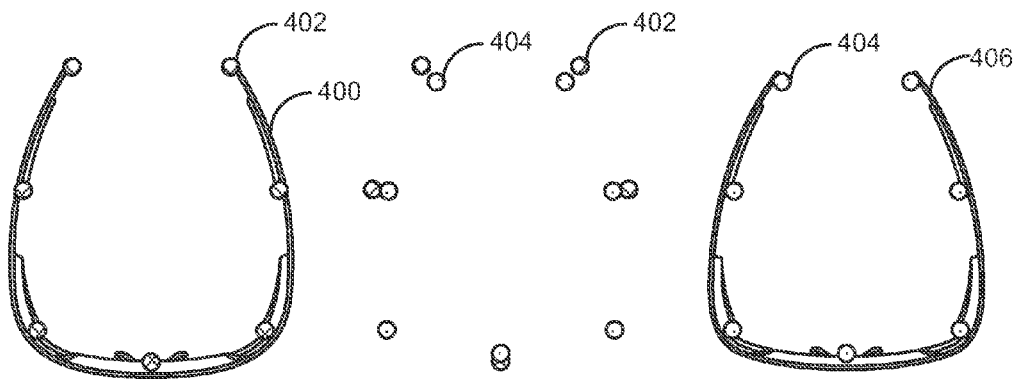
FIGS. 4A-4C schematically show an example user fit profile.

An example set of fit points of a user are schematically illustrated in FIG. 4B. The set of fit points 404 are depicted as the dotted circles. The set of fit points 404 shown in FIG. 4B may include a point corresponding to a bridge of the user's nose, points corresponding to the user's temples, points corresponding to the user's ears, and other locations. The set of fit points 404 may include virtually any number of fit points. Increasing numbers of fit points may provide for more precise customization. While FIG. 4B depicts the fit points in two dimensions, it should be appreciated that the fit points represent measurements of the user's head in three dimensions. However, embodiments where the fit points only represent measurements in two dimensions are also within the scope of this disclosure.

Figure 5:
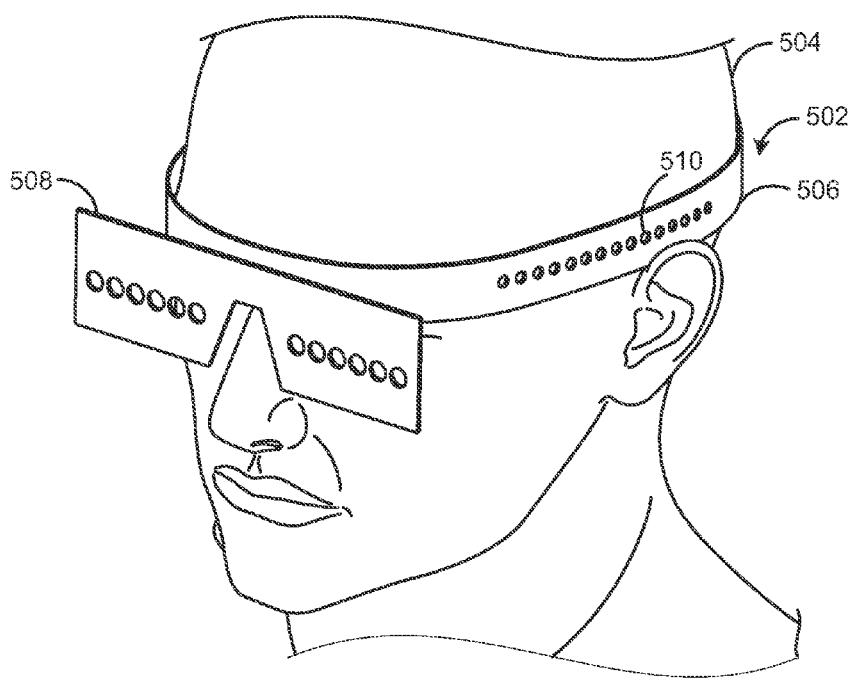
FIG. 5 schematically shows an example mechanism for manually measuring a user's fit points.

Returning to FIG. 3, receiving the IPD and plurality of fit points of the user may include receiving an IPD and fit points that have been measured manually by the user or a helper at 304. For example, the user may measure the fit points described above manually with a tape measure or another measurement instrument. One example measurement instrument is illustrated in FIG. 5. FIG. 5 schematically depicts a template 502 for measuring a head 504 of a user. As shown, the template 502 includes a head piece 506 and an eye piece 508, each having a measuring mechanism, such as a plurality of holes cut out of cardstock or other material, a plurality of inter-locking notches, etc., along with numerical values at one or more holes or inter-locking notches. The user may obtain measurements corresponding to each fit point by adjusting the head piece 506 to closely fit around his or her head 504 and recording numerical values from the head piece 506 that correspond to each fit point. For example, a set of corresponding inter-locking notches may define the user's head circumference, while the location of a hole (such as hole 510) may define the location of the user's ear. The IPD may be obtained by the user determining which holes of the eye piece 508 align with his or her pupils.

The measurement instrument illustrated in FIG. 5 is one non-limiting example of how a user's fit points and IPD may be measured manually. In another non-limiting example, the user could look through parallel cards that include horizontal and vertical slits, and determine which slits his or her pupils align with. In an additional non-limiting example, a retail location at which the user orders a customized HMD device may include a rigid mechanical armature, whether plastic or metal or some combination, configured to obtain measurements of the user's head. The armature may include sliding pieces that may be adjusted until a tight fit around the user's head is obtained. The armature may further include an eye piece configured to measure the user's IPD.

While measuring the fit points of the user manually may be simple and cost-effective, it may result in relatively coarse measurements. To obtain finer measurements, the user's head may be scanned using an electronic scanning system. As such, returning to FIG. 3, receiving the IPD and plurality of fit points of the user may include receiving an IPD and fit points that have been automatically measured by a retail scanning system at 306. Retail locations configured to distribute HMD devices may include a 3-D scanning system with a plurality of depth and/or visible light cameras, such as four cameras, six cameras, etc. The fit points of the user may be measured by the scanning system via images of the user acquired from the plurality of cameras. For example, each camera may simultaneously image a different location of the user's head, and the scanning system may be configured to compile a 3-D image of the user's head and identify the fit points and IPD from the 3-D image.

Further, in some embodiments, receiving the IPD and plurality of fit points of the user may include receiving fit points that have been automatically measured by a scanning system of the user at 308. The scanning system of the user may include one or more depth or visible light cameras configured to acquire images of the user and send the images to a computing system configured to identify the fit points and IPD of the user from the images. Additional detail regarding the scanning system of the user will be explained below with regard to FIGS. 6 and 7.

Continuing with FIG. 3, at 310 method 300 includes spacing exit pupils of a see-through display to match the IPD of the user. As explained above with respect to FIG. 1, the HMD device may include a see-through display with a right-eye module and a left-eye module, each of which includes an exit pupil. When the HMD device is assembled, the modules of the see-through display may be spaced apart from each other at a distance equal to the IPD of the user. At 312, a frame is customized to accommodate the fit points of the user. The frame of the HMD device may include a plurality of adjustable sizing points, and the frame may be customized by adjusting the sizing points to closely accommodate the fit points of the user.

FIG. 4A shows sizing points 402 of a non-customized, generic HMD device 400 as hash-marked circles. As depicted in FIG. 4B, each sizing point 402 of the HMD device may not align with a corresponding fit point of a user. However, as shown in FIG. 4C, following customization of the HMD device 406, as will be explained in more detail in FIGS. 8-15, the sizing points 402 of the HMD device are adjusted to closely accommodate, e.g., substantially align with, the fit points 404 of the user.

Returning to FIG. 3, at 314, the see-through display is coupled to the customized frame. Coupling the see-through display to the customized frame includes, at 316, assembling the head-mounted display device based on the fit points such that exit pupils of the see-through display are substantially aligned with the user's pupils when the HMD device is worn by the user. As will be explained in detail below, each module of the see-through display may be coupled to the frame via a brow bar, and may be coupled to the brow bar at a distance equal to the IPD of the user. Further, this may include spacing each module of the see-through display at a distance relative to the user's nose. As the user's face may not be symmetrical, the distance between the right eye and nose of the user and the distance between the left eye and nose of the user may not be equal. Thus, the see-through display may be coupled to the frame at a distance equal to the IPD of the user, but in positions relative to both the user's eyes and nose.

At 318, external components are coupled to the HMD device. The external components may include one or more of an audio system, control system, sensors, and fit components.

Parts of method 300 may be carried out by one or more computing devices, such as computing system 1600, described below with respect to FIG. 16. For example, the fit points of the user may be received by a modeling module of a computing device that outputs a custom 3-D model of the HMD device including sizing points to accommodate the fit points of the user. This 3-D model may then be utilized by a fabrication system, controlled by the same computing device or by another computing device, to fabricate one or more components of the HMD device.

In embodiments where the fit points are measured manually, the user may input the fit points to the modeling module, or the user may input the fit points to a remote device that may send the fit points to the modeling module. In embodiments where the fit points of the user are measured automatically, such as by a retail or user scanning system, the scanning system may send the fit points directly to the modeling module, or the scanning system may send the fit points to a remote device, such as a server, and the modeling module may receive the fit points via the server.

Figure 6:
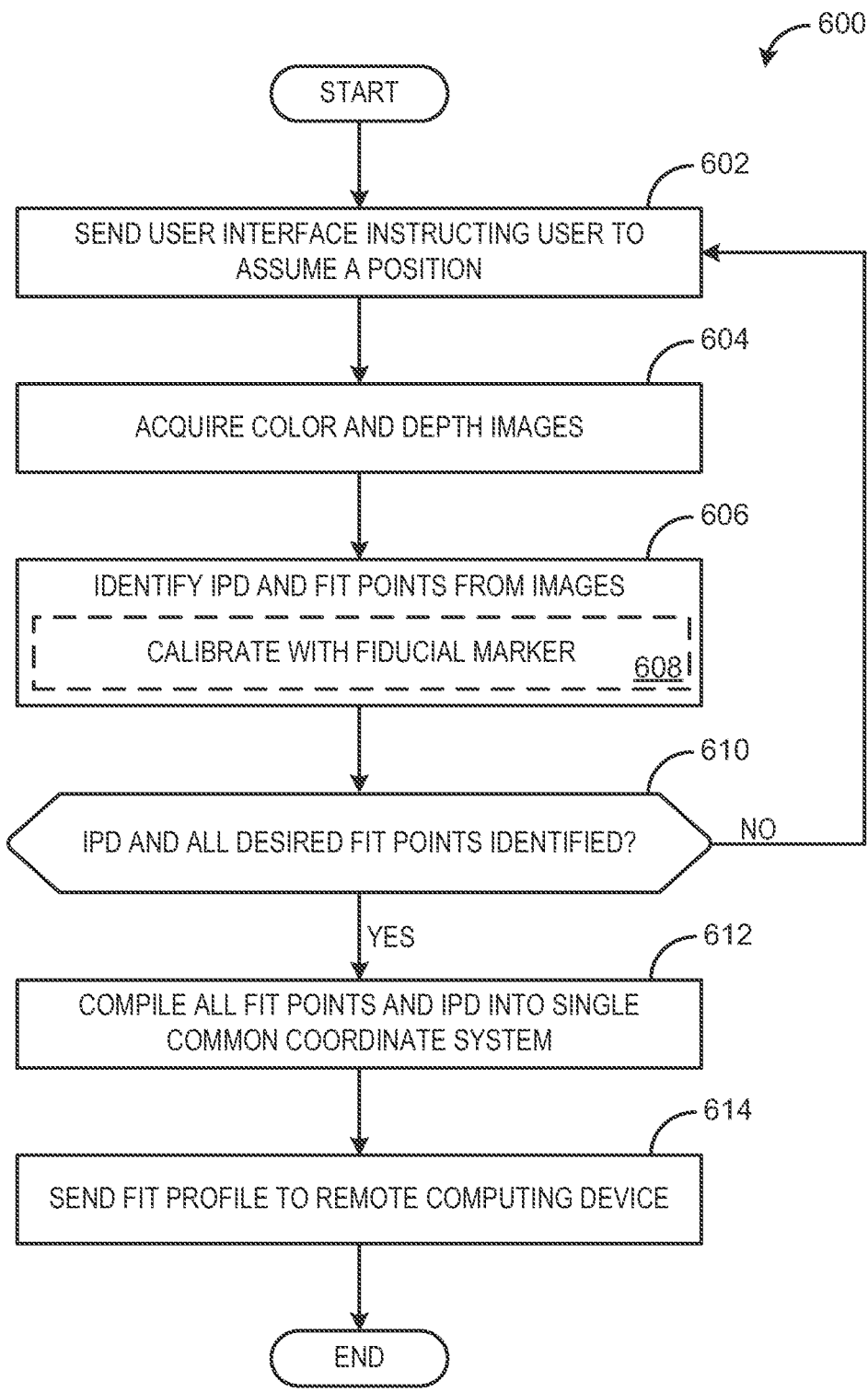
FIG. 6 is a flow chart illustrating a method for obtaining a user fit profile according to another embodiment of the present disclosure.

FIG. 6 illustrates a method 600 for obtaining a fit profile of a user. Method 600 may be carried out by a scanning system of the user, such as the system described below with respect to FIG. 7. Method 600 includes, at 602, sending to a display device a graphical user interface instructing the user to assume a particular position. For example, text, video, and/or audio prompts that instruct the user where to stand, which direction to face, etc., may be displayed via the display device. At 604, one or more color and depth images of the user are acquired. The scanning system may include a visible light camera and/or a depth camera, and acquire the color and depth images from the visible light and depth camera, respectively.

At 606, method 600 includes identifying a fit profile of the user from the one or more depth and color images. As explained previously, the fit profile includes an interpupillary distance and one or more fit points of the user. The IPD may be identified from one or more color and depth images acquired by the visible light and depth cameras. Identifying the IPD includes locating each of the user's pupils, which may be visible in a color image of the user, and determining the distance between the centers of each pupil. The one or more fit points of the user may be identified from one or more depth images acquired by the depth camera.

To ensure a high-fidelity determination of the IPD and fit points, the measurements may be calibrated using fiducial markers at 608. For example, the user interface sent to the display device may optionally prompt the user to fix a marker to his or her head prior to acquiring the images. The marker may be of a known size and visible in both the color and depth images. Alternatively or additionally, visible and/or IR light may be projected on to the user in a known location to calibrate the measurements and/or align the multiple color and depth images.

At 610, it is determined if the IPD and all desired fit points have been identified. If the IPD and all desired fit points have not been identified, method 600 returns to 602 to instruct the user to assume a particular position. The position may be different than the first position the user was instructed to assume, in order to acquire images of a different region of the user's head. If it is determined that the IPD and all fit points have been identified, method 600 proceeds to 612 to compile the fit points and IPD into a single common coordinate system. As the fit points and IPD may be identified from a plurality of images, in order to combine the fit points and IPD into a single fit profile, each fit point and the IPD may be assigned a set of coordinates relative to a fixed data point. For example, the fixed data point may be the midpoint between the user's pupils, or may be a point on the fiducial marker fixed to the user. Each fit point and center of each pupil may be assigned an x, y, z coordinate relative to the fixed data point.

At 614, the fit profile is sent to a remote computing device, such as a server or to a computing device configured to produce a model of the HMD device based on the fit profile.

While the embodiment depicted in FIG. 6 includes the scanning system identifying the fit points and IPD, in other embodiments the images themselves may be sent to a remote computing device configured to identify the fit points from the images. In other embodiments, the fit points and IPD may be represented by a mechanism other than the x, y, z coordinate system. For example, the fit points may be represented by a deviation from a common fit profile (e.g., each fit point may be represented as a difference between the measured fit point location and an average location for that fit point), or other suitable mechanism.

Figure 7:
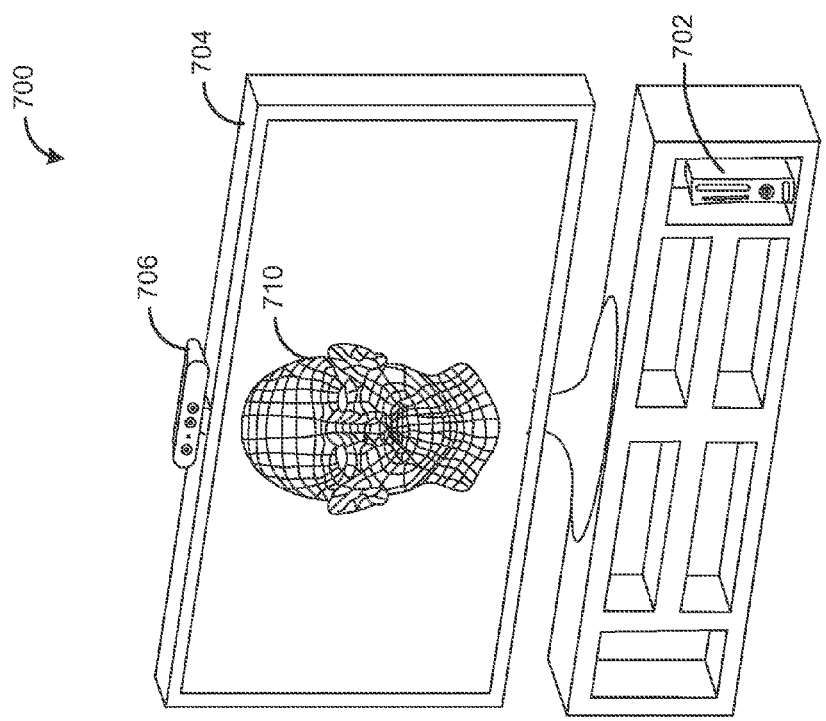
FIG. 7 schematically shows an example user scanning system.
Figure 7:
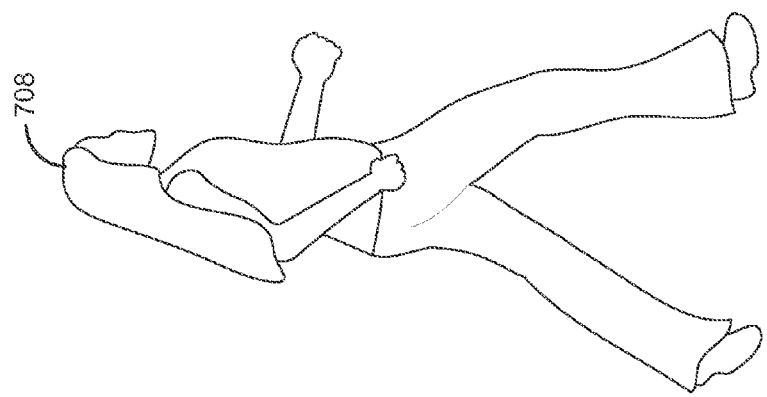

FIG. 7 shows a non-limiting example of a user scanning environment 700 in the form of an entertainment system 702, a display device 704, and one or more sensors 706. The display device 704 may be operatively connected to the entertainment system 702 via a display output of the entertainment system. For example, the entertainment system may include an HDMI or other suitable display output. The display device 704 as shown in FIG. 7 is in the form of a television or a computer monitor, which may be used to present a graphical user interface to a user 708. The graphical user interface may instruct the user 708 to assume one or more positions in order to acquire images and identify the user's fit point measurements and IPD from the acquired images.

FIG. 7 shows that the scanning environment 700 may be used by the user 708 in order to obtain a fit profile, which may then be sent to a remote computing device to create a customized HMD device for the user. As explained above, the user's fit profile may be identified through images acquired by one or more sensors 706, such a visible light camera or depth camera, that identifies, monitors, or tracks the user 708. The one or more sensors 706 may be operatively connected to the entertainment system 702 via one or more sensor inputs. As a non-limiting example, the entertainment system 702 may include a universal serial bus to which a depth camera may be connected.

In one example, after presenting instructions to the user 708 via the display device 704, entertainment system 702 may acquire one or more images of the user's head via one or more sensors 706. The images may be depth images taken from a depth camera, such as an infra-red (IR) camera, and/or images taken from a visible light camera, such as an RGB camera. The user interface may instruct the user to change positions so that images of the user's entire head are taken. The entertainment system may compile all or a subset of the images into a 3-D model of the user's head, represented on the display device as head model 710. Based on the model, the entertainment system 702 may identify a plurality of fit points and the user's IPD. For example, the color images may be used to identify the user's IPD, while the depth images may be used to identify the fit points of the user.

The entertainment system 702 may be configured to communicate with one or more remote computing devices, not shown in FIG. 7, in order to send the fit points and IPD to a remote computing device, where they will be available as the user's fit profile for subsequent assembly of the customized HMD device.

While the embodiment depicted in FIG. 7 shows the entertainment system 702, display device 704, and sensors 706 as separate elements, in some embodiments one or more of the elements may be integrated into a common device. For example, the entertainment system 702, display device 704, and sensor 706 may be integrated in a laptop computer, tablet computer, mobile telephone, mobile computing device, etc.

Thus, the embodiments of FIGS. 3-7 provide for obtaining a user fit profile that may be utilized to fabricate a custom HMD device. The fit profile may include various head measurements and the IPD of the user. Each user may not have an IPD that is proportional to his or her head size. For example, a user may have a relatively wide IPD while having a relatively small head. To accommodate variation in IPD and head sizes among users, the HMD devices may be assembled from modular components sized to cover a wide range of head sizes and IPDs. Various embodiments for assembling customized modular HMD devices are presented below.

Figure 8:
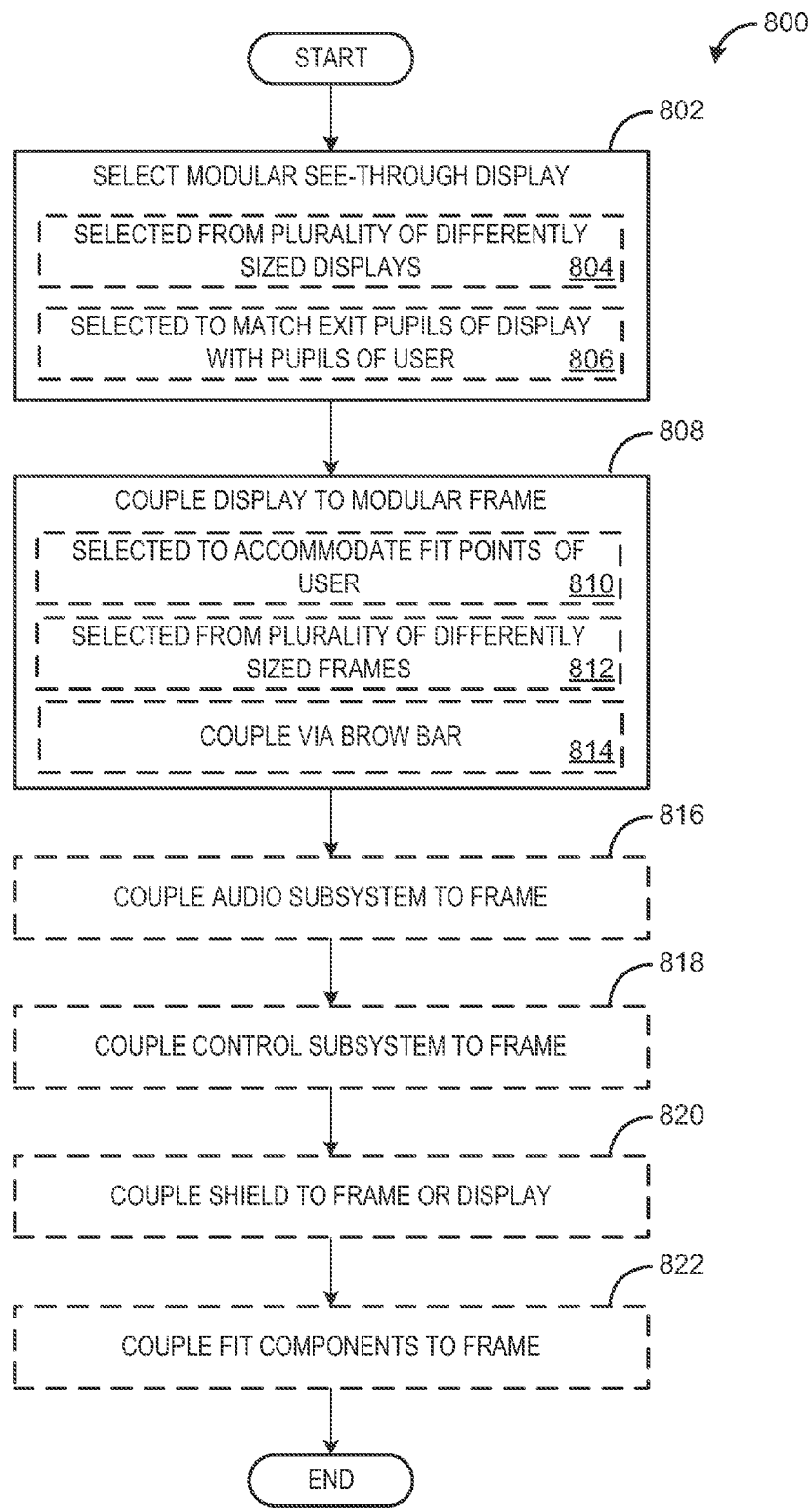
FIG. 8 is a flow chart illustrating a method for assembling a modular head-mounted display device according to an embodiment of the present disclosure.

FIG. 8 illustrates a method 800 for assembling a modular head-mounted display device customized for a user. The modular HMD device may be comprised of multiple components configured to be coupled together to create the HMD device. Some of the components, such as the frame and see-through display, may be manufactured in multiple sizes, and during the assembly of the HMD device, the component sizes that most closely match the fit profile of the user are selected to be included in the HMD device. Additional customization may be provided by coupling a plurality of fit components, such as nose pieces and temple pads sized for the user, to the assembled HMD device.

At 802, method 800 includes selecting a modular see-through display. Selecting the modular see-through display includes selecting a modular see-through display from a plurality of differently-sized see-through displays at 804, in order to provide a see-through display that closely accommodates a user fit profile. For example, the see-through display may include a right-eye module and a left-eye module, each manufactured in a plurality of sizes. Each module may be selected to closely match the fit points of the user. As such, selecting the modular see-through display also includes selecting the modular see-through display to match exit pupils of the display with the pupils of the user at 806. The selected size of the see-through display modules may be based on an IPD-to-head size relationship of the user to align the exit pupils of the see-through display as closely as possible with the exit pupils of the user. For example, the modular see-through display may be selected such that exit pupils of the modular see-through display are spaced apart by a distance that matches the IPD of the user when the modular see-through display is coupled to a modular frame. When matching the exit pupils of the see-through display with pupils of the user, the exit pupils may be substantially aligned with the user's pupils, for example each exit pupil may be aligned within 4 mm of each pupil of the user, within 1 mm of each pupil, or another suitable range.

At 808, method 800 includes coupling the selected see-through display to a modular frame. Coupling the selected modular see-through display to a modular frame includes coupling the selected modular see-through display to a modular frame that closely accommodates the user fit profile at 810. Similar to selecting the see-through display, the modular frame may be selected from a plurality of differently-sized modular frames at 812. At 814, coupling the selected modular see-through display to the modular frame includes coupling the see-through display to the frame via a brow bar. The brow bar may mechanically hold the see-through display modules at a certain distance apart (e.g., a distance equal to the IPD of the user). The brow bar may act as the backbone of the HMD device in that it couples the see-through display, frame assembly, and additional optional componentry (such as a nose piece) together. The brow bar includes one or more mounts for coupling to the see-through display and additional mounts for coupling to the frame.

Figure 9A:
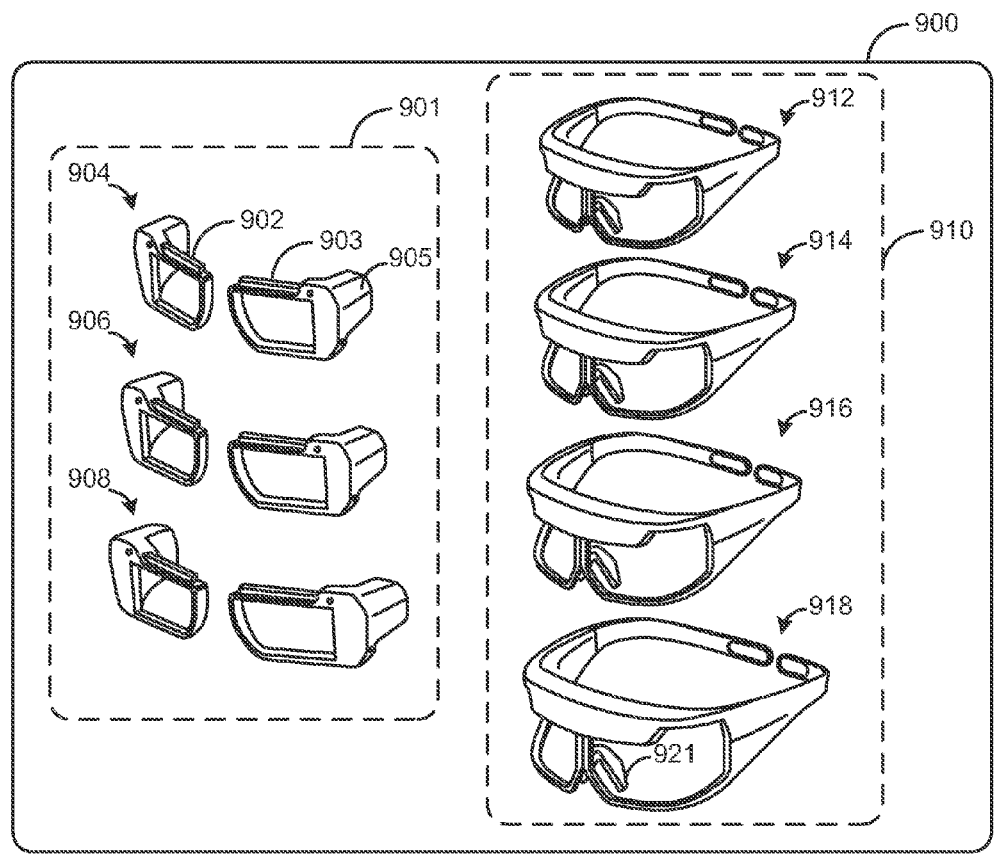
FIGS. 9A and 9B schematically show example modular component sets according to an embodiment of the present disclosure.

FIG. 9A illustrates example component sets 900 that may be utilized during the assembly of a modular HMD device. Modular see-through display set 901 includes a plurality of differently-sized versions of a see-through display, each including a right-eye module 902 and a left-eye module 903. Each right-eye module and left-eye module includes an optics pod 905 that may include one or more inward and/or outward facing sensors, a control module, and/or electronic interfaces. In the example embodiment depicted, modular see-through display set 901 includes a small-sized see-through display 904, medium-sized see-through display 906, and large-sized see-through display 908, from which a desired see-through display may be selected. However, any number of versions of see-through displays is within the scope of this disclosure.

In one example, each sized-version of the see-through displays may be adjustable to cover an IPD range of 6 mm, in order to provide a total accommodation of 18 mm variation in IPD distances. As adult IPDs typically range from, for example, 53 mm to 70 mm, an 18 mm range may provide suitable coverage for nearly all adult IPDs. Thus, see-through display 904 may cover IPDs in the range of 53-58 mm, see-through display 906 may cover IPDs in the range of 59-64 mm, and see-through display 908 may cover IPDs in the range of 65-70 mm. However, by altering the size ranges covered by each sized-version and/or including additional sized-versions, other size ranges may be accommodated.

Modular frame set 910 includes a plurality of differently-sized versions of a frame. As depicted, modular frame set 910 includes a small-sized frame 912, medium-sized frame 914, large-sized frame 916, and extra-large-sized frame 918. However, any number of versions of frames in the modular frame set is within the scope of this disclosure. While each frame version depicted in modular frame set 910 includes a nose piece 921 attached to the frame, in some embodiments the nose pieces may be provided separately. Further, the nose pieces, as well as other fit components not illustrated in FIG. 9A, may be provided in a plurality of different sizes.

Figure 9B:
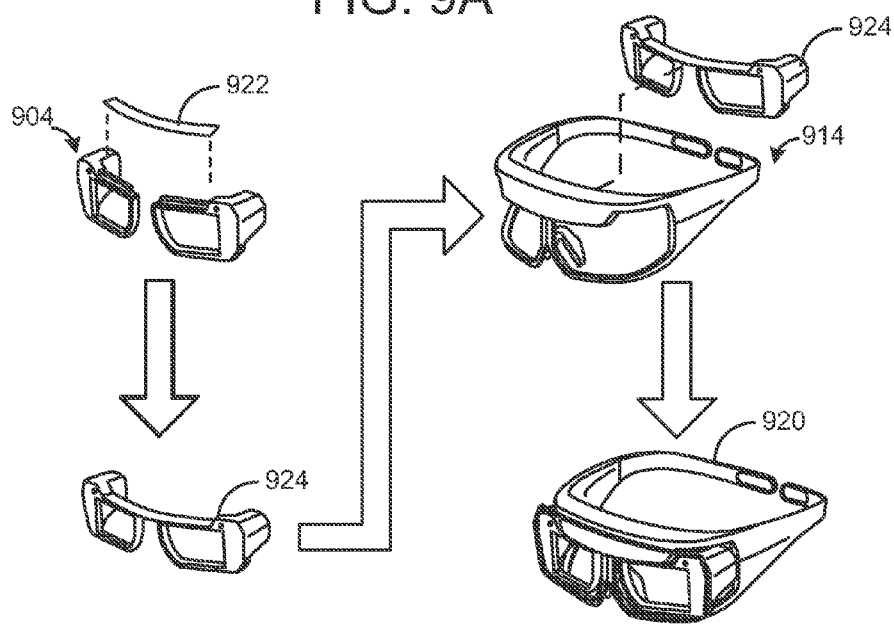

FIG. 9B illustrates the assembly of an example HMD device 920 utilizing selected modular components. A modular see-through display selected from set 901, such as see-through display 904, is coupled to brow bar 922, which may include one or more sensors, a control module, and/or electronic interfaces, to form a modular see-through display sub-assembly 924. Modular see-through display 904 may be selectably coupled to the brow bar 922 so that the exit pupils of the see-through display are spaced at a distance equal to the IPD of the user. For example, the brow bar 922 may include a mounting rail to which each module of the see-through display is mounted. The rail may be configured to allow infinite mounting locations or incremental mounting locations.

Modular see-through display sub-assembly 924 is then coupled to a modular frame selected from modular frame set 910, such as frame 914, to form HMD device 920. The modular see-through display sub-assembly 924 may be coupled to a single location on the frame via the brow bar, or may be coupled via multiple locations. However, regardless of the sizes of the selected see-through display and frame, the modular see-through display sub-assembly is configured to be mounted to a common location on each frame. Further, each sized-version of the see-through display is configured to be mounted to any-sized version of the frame, i.e., if three differently-sized versions of the see-through display and four differently-sized versions of the frames are provided, twelve HMD device configurations are possible. However, near infinite variations within each configuration may be possible due to variable spacing provided by the brow bar.

Returning to FIG. 8, after coupling the see-through display to the frame, method 800 optionally includes coupling an audio sub-system to the frame at 816. In some embodiments, the audio sub-system may be provided separately from the frame and coupled to the frame as an external component. However, in other embodiments, the audio system may be integrated into the frame, and thus is not coupled to the frame separately.

At 818, method 800 includes optionally coupling a control sub-system to the frame. Similar to the audio sub-system, the control sub-system may already be integrated in the frames, or may be coupled as a separate component. In other embodiments, the control sub-system may be integrated in the see-through display, or integrated in the brow bar.

At 820, a shield may be optionally coupled to the see-through display or frame. The shield may protect the see-through display from movement and degradation as well as provide cosmetic detail to the HMD device, and depending on the desired configuration, may be coupled to the see-through display directly, or may be coupled to the frame or brow bar. Further, in some embodiments, the shield may be integrated with the see-through display.

At 822, a plurality of fit components are optionally coupled to the frame. The fit components may include a nose piece, temple pads, forehead pads, and other fit features. These fit components may be available in a variety of shapes, textures, materials, and finishes to provide fine tuning of the final fit of the HMD device.

Method 800 allows for selection of differently sized modular components which may be assembled to form a customized HMD device. The modular components are designed in such a manner that any size of each modular component may be coupled with any size of the other modular components. For example, a plurality of differently-sized see-through display sub-assemblies may be provided. Each see-through display sub-assembly may include a see-through display and a brow bar coupled to the see-through display. The brow bar may include one or more mountings at a common mount location. As used herein "common mount location" refers to a mount location that is at a common location on each brow bar, regardless of the size of the brow bar.

Each brow bar may be configured to be mounted to any size of a plurality of differently-sized frames via the one or more mountings of the brow bar to one or more mount points of the frames. Thus, the brow bar and frame may be coupled to each other at the same location for each HMD device that is assembled. This is accomplished by each of the differently-sized frames having the same mount points to fit the common mount location of the brow bar. Further, the see-through display sub-assembly is configured to be mounted to any frame of the plurality of differently-sized frames in the same location on each frame, and an audio subsystem may be configured to be mounted to any sized frame of the plurality of differently-sized frames.

Figure 10:
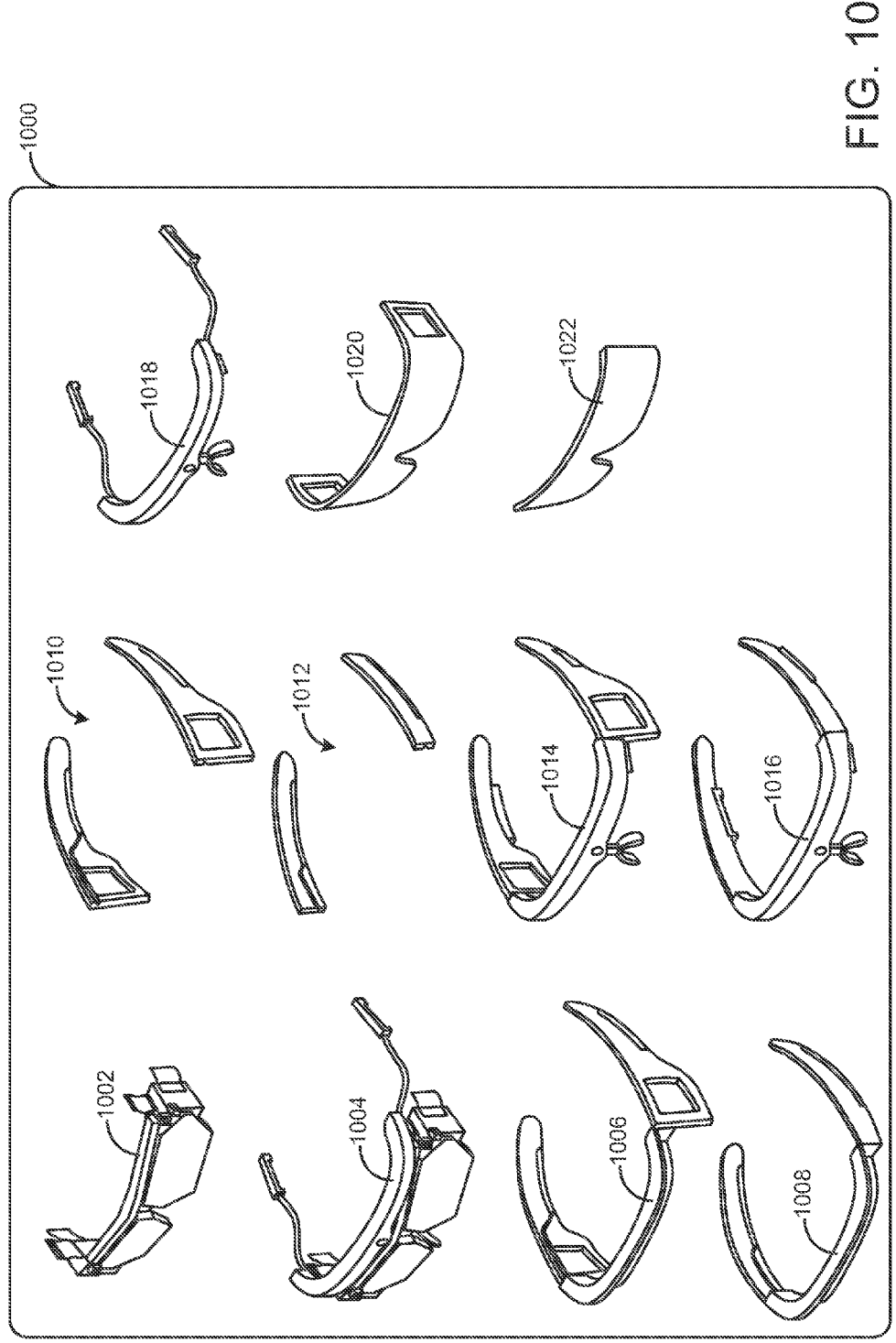
FIG. 10 schematically shows an example menu of modular components for assembling a head-mounted display device according to an embodiment of the present disclosure.

As explained above with respect to method 800 of FIG. 8, the assembly of the modular HMD device involves coupling various modular components together to create a final HMD device. The components include one or more of a see-through display sub-assembly (including brow bar), frame, audio sub-system, control sub-system, and fit components. Further, each component may be manufactured separately and coupled together during assembly. However, in some embodiments, one or more of the components may be integrated during manufacture. FIG. 10 illustrates an example "menu" 1000 of possible components that may be selected from during assembly of a modular HMD device. While a single size is illustrated for each different modular component, it is to be understood that each such component have a plurality of different sizes.

Menu 1000 may include multiple see-through display configurations. See-through display configuration 1002 includes a right-eye module, left-eye module, brow bar, and optics pods. The optics pods may include the optical sensors, cameras, and other components to present images to the user, track user eye movement, and perform other optical tasks. See-through display configuration 1004 includes all the components of configuration 1002 plus a control assembly and audio assembly coupled to the brow bar and/or see-through display modules.

Menu 1000 may also include multiple frame configurations. The frame may be a single piece or may be comprised of one or more of a front bridge, left temple arm, and right temple arm. Frame configuration 1006 includes a front bridge and right and left temple arms. The left and right temple arms of frame configuration 1006 include bumpers to protect the optics pods of the see-through display. Frame configuration 1008 includes a front bridge and right and left temple arms, similar to frame configuration 1006. However, the right and left temple arms of frame configuration 1008 do not include bumpers.

Frame configurations 1010 and 1012 each include only right and left temple arms, with the temple arms of 1010 including bumpers while the temple arms of 1012 do not include bumpers. Frame configuration 1014 and frame configuration 1016 each include right and left temple arms coupled to a control system and an audio system. The temple arms of frame configuration 1014 include protective bumpers.

Menu 1000 also includes additional component configurations separate from a frame or see-through display configuration. Component configuration 1018 includes a control system and an audio system. Component configurations 1020 and 1022 each include a shield to cover and protect a see-through display. The shield of component configuration 1020 includes protective bumpers to protect the optics pods of the see-through display while the shield of component configuration 1022 does not include bumpers.

No aspect of FIG. 10 is intended to be limiting in any sense, for numerous variants are contemplated as well. In some embodiments, for example, each of the audio sub-system and the control sub-system may be provided as a separate component. In other embodiments, the nose piece and other fit components may each be provided as a separate component, or may be integrated with the frame, brow bar, or other components.

Figure 11:
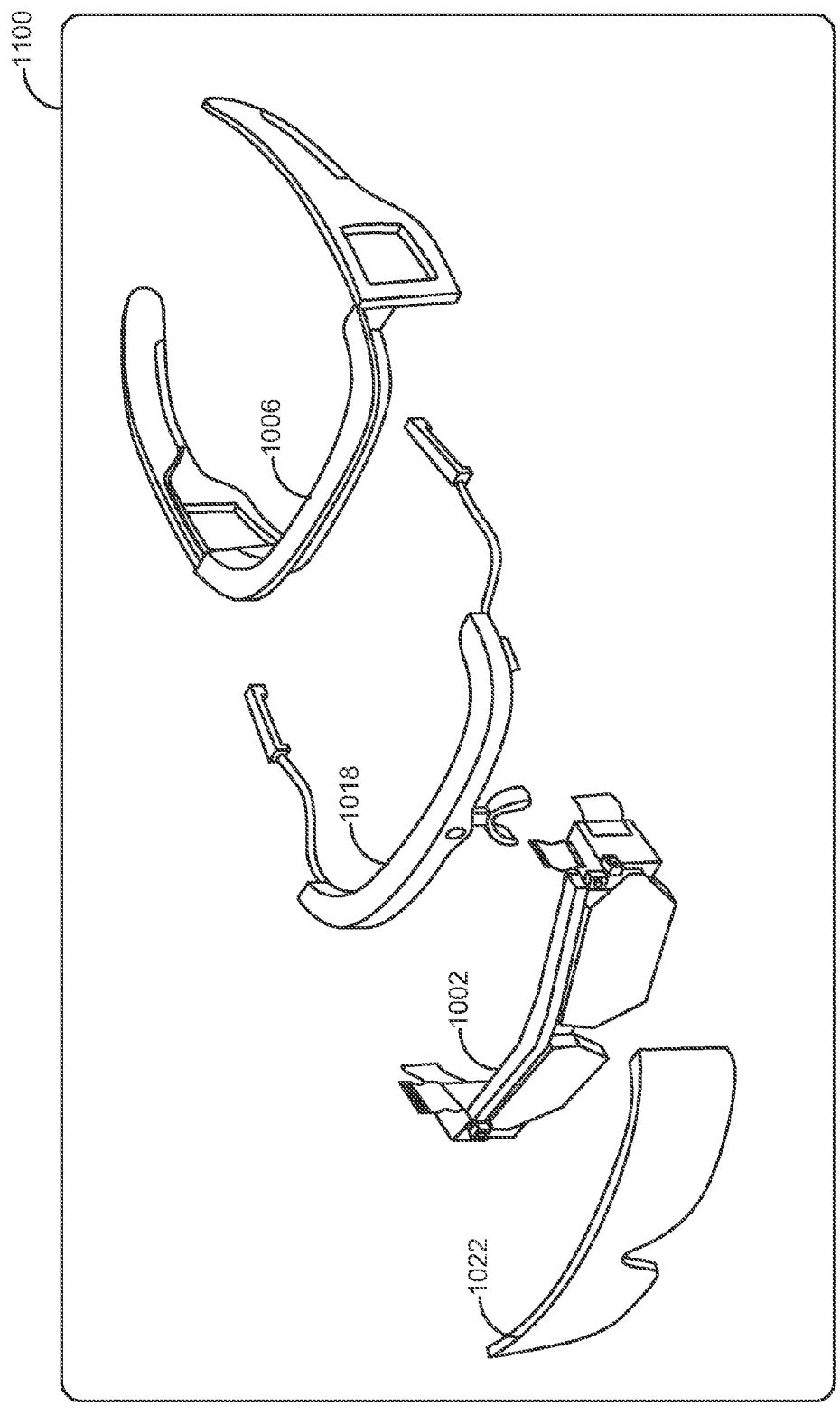
FIG. 11 schematically shows an example head-mounted display device assembled from the menu of FIG. 10.

Thus, when assembling a modular HMD device, subsets of the above or other components may be selected and coupled together. FIG. 11 is an example modular HMD device 1100 assembled utilizing components selected from menu 1000 of FIG. 10. Modular HMD device 1100 includes frame configuration 1006, which includes right and left temple arms with bumpers and a front bridge integrated as a single component. Frame configuration 1006 is coupled to see-through display configuration 1002 via the brow bar of see-through display configuration 1002. The control and audio systems are provided via component configuration 1018 (which also includes a nose piece). The component configuration 1018 may be coupled to the brow bar and/or to the frame configuration 1006 (for example, the audio system may be coupled to the temple arms of the frame). Finally, a shield is provided via component configuration 1022 to protect the see-through display. Additional components not shown, such as temple pads, may also be coupled to HMD device 1100.

The example HMD device 1100 presented in FIG. 11 is one non-limiting example of how selected components from menu 1000 of FIG. 10 may be assembled to form an HMD device. In another non-limiting example, frame configuration 1016 may be coupled to see-through display configuration 1002 and component configuration 1020. In this example, the control sub-system and audio sub-system are integrated into the frame, and the shield provides protection for the optics pods of the see-through display.

In another non-limiting example, see-through display configuration 1004 may be coupled to frame configuration 1006, with component configuration 1020. In this example, the control sub-system and audio sub-system are integrated with the see-through display. Doing so provides for a simple frame assembly without built-in electronics. In such circumstances, a third-party frame manufacturer may fabricate the frames according to a "hardware developer's kit," which specifies assembly features, fit point dimensions, and electrical specifications (for accommodating electrical connections between components) of the frames. The see-through display, including optics pods and brow bar, control sub-system, and optionally the audio sub-system, may be coupled to the frames at a later step to form the HMD device.

Thus, the embodiments depicted in FIGS. 8-11 provide for a modular HMD device including a modular frame assembly and a modular see-through display sub-assembly. The frame assembly may include one or more different components, each of the different components selected from a component set. The component set may include at least two or more differently-sized versions of each different component. For example, the frame assembly may include a front bridge and a right and left temple arm. Each of the front bridge, right temple arm, and left temple arm may be selected from a respective component set to provide as close a match as possible to the user's fit points.

The modular see-through display sub-assembly may comprise a see-through display, a plurality of optical sensors, and a brow bar. The modular see-through display sub-assembly may include one or more mountings for selectably coupling the modular see-through display sub-assembly to the modular frame assembly. Similar to the frame assembly, the modular see-through display sub-assembly may include one or more different components, each of the different components selected from a component set including at least two or more differently-sized versions of each different component.

The modular see-through sub-assembly may be coupled to the modular frame assembly via the brow bar. The brow bar may be coupled to the mountings of the see-through display sub-assembly. The modular see-through display sub-assembly may be configured to couple to any combination of differently-sized versions of each different component of the modular frame assembly, in order to provide a customized HMD device sized to a particular user.

Further, as explained previously, additional components may be coupled to the see-through display and/or frame, including an audio system, control system, and fit components. The fit components may be selected from a variety of shapes and sizes to finalize the fit of the HMD device to the user. However, in some embodiments, to provide even higher precision customization, the frame assembly may be fabricated using a high-volume method of assembly to produce a customized frame for each user of a plurality of users. Embodiments for customizing the frame will be presented below.

Figure 12:
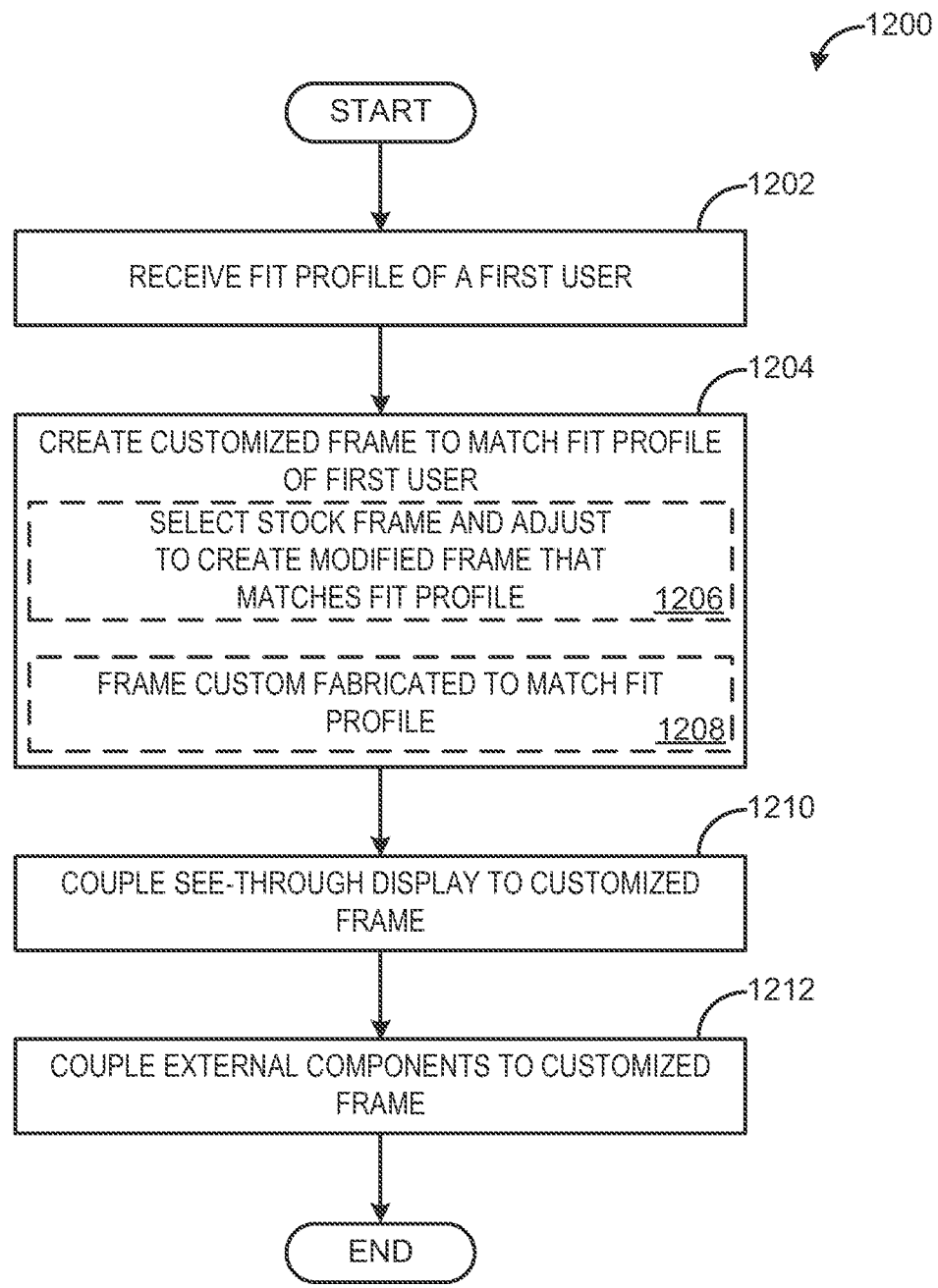
FIG. 12 is a flow chart illustrating a high-volume method of assembling a customized head-mounted display devices according to an embodiment of the present disclosure.

FIG. 12 illustrates a high-volume method 1200 of assembling a customized augmented reality device, such as an HMD device. Method 1200 includes, at 1202, receiving a fit profile of a first user. As explained previously, the fit profile of the user includes an IPD and a plurality of fit points of the user. At 1204, method 1200 includes creating a customized frame to match the fit profile of the first user.

Creating the customized frame may be carried out according to a variety of different embodiments. In one example, creating the customized frame includes, at 1206, selecting a stock frame and adjusting the stock frame to create a modified frame that matches the fit profile. The stock frame may be selected from a set of different frame sizes, and the selected stock frame may be a size that is a closer match to the fit profile than other frame sizes in the set. The stock frame may be adjusted manually or robotically at one or more adjustable sizing points to create the modified frame. The modified frame may provide a closer match to the fit profile than the stock frame. Additional detail regarding selecting a stock frame and adjusting the stock frame to create a modified frame will be presented below with respect to FIGS. 13-15.

In another example, creating a customized frame includes, at 1208, custom fabricating the frame to match the fit profile. The entire frame may be built as one or more pieces that are custom-shaped to the user, for example by using a rapid prototyping process.

At 1210, a see-through display is coupled to the customized frame. The see-through display may be a see-through display sub-assembly that includes a brow bar, optics components (such as optical sensors), and mounts to couple the sub-assembly to the frame. The see-though display may be selected from a plurality of differently-sized see-through displays to space exit pupils of the see-through display equal to the IPD of the first user, similar to the modular assembly embodiment described above with respect to FIG. 8.

At 1212, external components may be coupled to the customized frame. As explained previously, the external components may include one or more of an audio system, control system, and fit components.

Method 1200 may be repeated for each additional user fit profile. For example, method 1200 may be repeated for a second user. The IPD and/or plurality of fit points of the second user may be different than the IPD and plurality of fit points of the first user, and hence the frame of the second user may be customized to be a different size than the frame of the first user. Further, the see-through display selected for the second user may be of a different size than the see-through display selected for the first user.

Both the HMD device assembled for the first user and the HMD device assembled for the second user may include a set of mountings. For example, the first see-through display may be coupled to the first customized frame via a first set of mountings, and the second see-through display may be coupled to the second customized frame via a second set of mountings. The first set of mountings may be positioned at a first location on the first frame and the second set of mountings may be positioned at a second location on the second frame, with the first and second locations having identical relative positions. In this way, any see-through display may be coupled to any sized frame in a common location.

Figure 13:
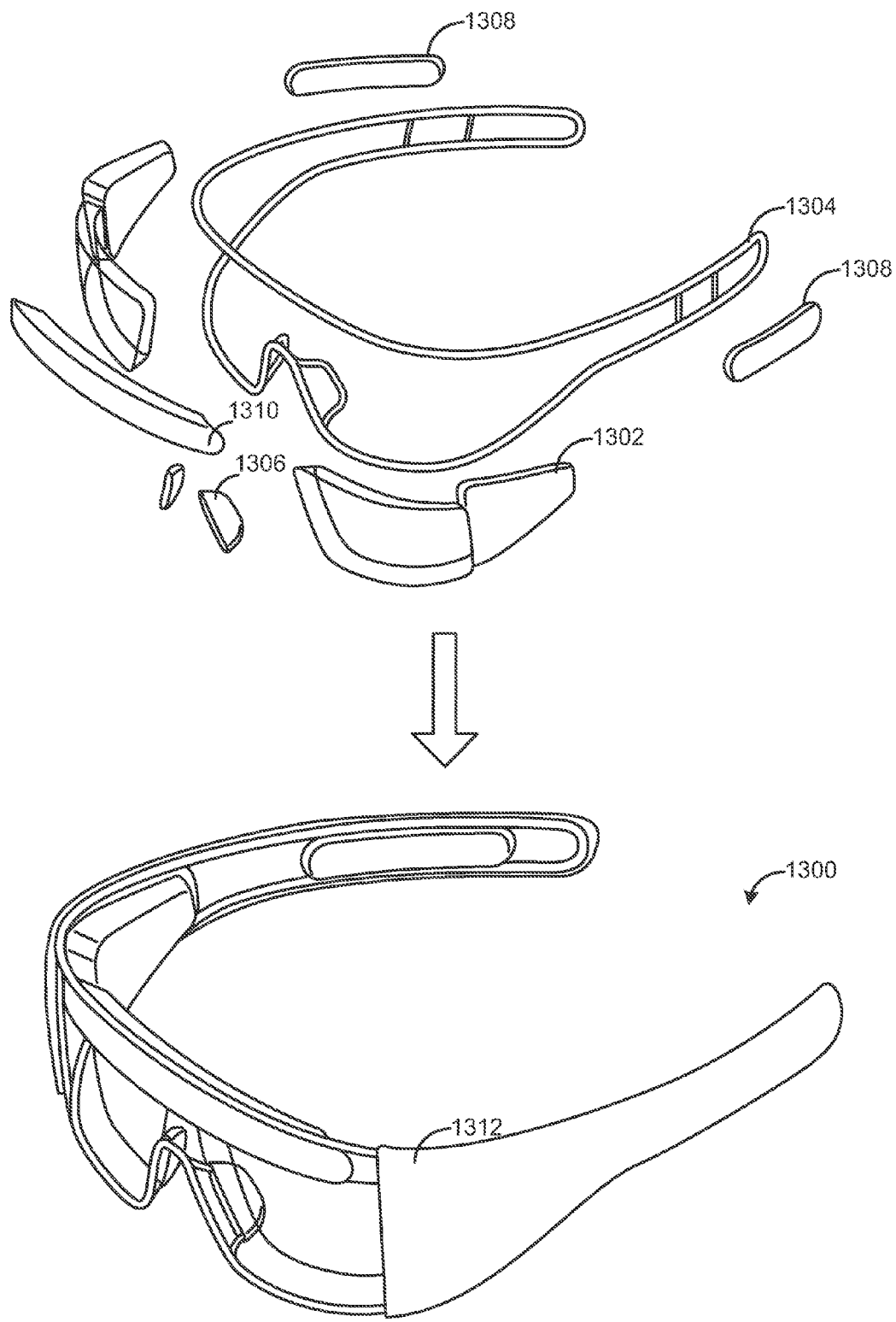
FIGS. 13-15 schematically show example customized frames according to embodiments of the present disclosure.

FIG. 13 schematically shows an HMD device 1300 including a modular see-through display 1302 and a customized frame 1304 according to an embodiment of the present disclosure. The HMD device 1300 includes a chassis-style frame 1304 comprised of metal or plastic, for example. The frame 1304 includes sections that may slide, pivot, or otherwise be manually adjusted relative to other components. For example, the portions of the frame configured to rest adjacent to a user's temples (e.g., temple arms) may include telescoping rails that allow the length of the temple arms to be adjusted. During customization and assembly of the HMD device 1300, the frame 1304 may be adjusted to accommodate the fit points of a user.

The frame 1304 also includes fixed and/or adjustable mounting features (e.g., sliding rails, tabs, slots) to which a see-through display sub-assembly may be mounted. Additional features, such as a nose piece 1306, temple pads 1308, brow bar 1310, etc., may be coupled to the frame 1304. After each component has been coupled to the frame, an elastic skin 1312 may be stretched over the frame and components (while leaving the see-through display exposed). The skin 1312 may be comprised of fabric or pre-formed elastomer. The skin 1312 may be attached to the frame at fixed points, or may be attached via a continuous method such as a snap-fit rail. While FIG. 13 illustrates the skin 1312 being attached as the final step in assembling the HMD device 1300 (after each component has been coupled to the frame), in some embodiments, the skin 1312 may be attached prior to the coupling of some or all of the components.

Figure 14:
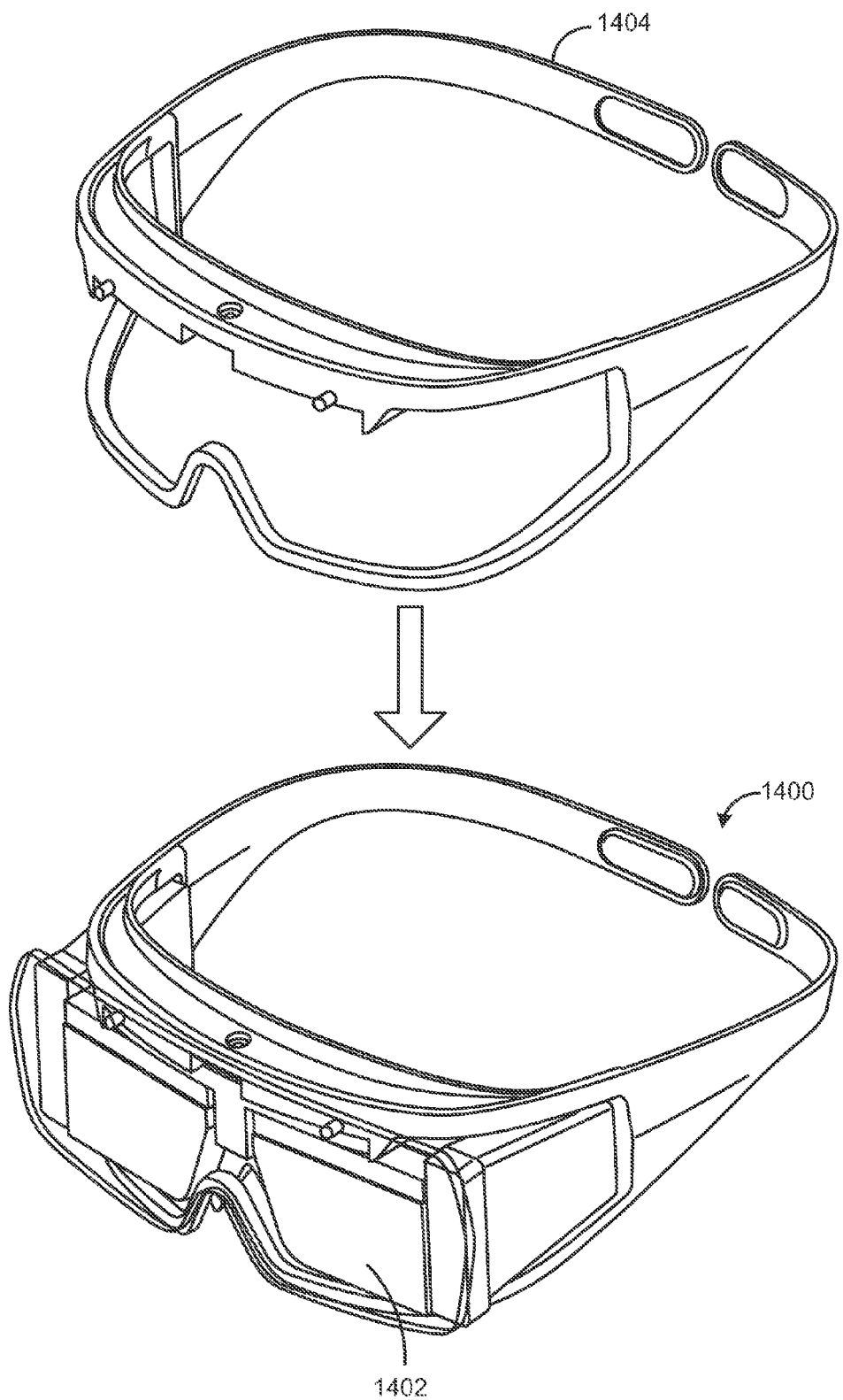

FIG. 14 schematically shows an HMD device 1400 including a modular see-through display 1402 and a customized frame 1404 according to another embodiment of the present disclosure. Frame 1404 may be selected from a plurality of differently-sized stock frames and adjusted to create a modified frame to accommodate a user's fit points. In one example, frame 1404 may include an armature fabricated from a formable material such as spring steel, titanium, or other suitable material. The armature may be manufactured as a single piece or as multiple pieces coupled together. A flexible elastomeric material may be injection molded over the armature. Following the injection molding, the frame 1404 may be robotically adjusted at one or more sizing points of the frame to closely accommodate the fit points of the user, including allowances for spring-back after adjusting. Referring back to FIGS. 4A-4C, the sizing points on the non-customized frame depicted in FIG. 4A may be robotically adjusted in order to customize the frame to match the user fit points and produce the customized frame of FIG. 4C. Continuing with FIG. 14, once frame 1404 has been robotically adjusted and allowed to cool or otherwise take a positional set, the see-through display 1402 and additional components are coupled to the frame 1404 to form the HMD device 1400.

In another example, frame 1404 may be comprised of only a molded thermoplastic material. Frame 1404 may be molded to a stock size and robotically adjusted after molding at one or more sizing points to closely accommodate the fit points of the user, including allowances for spring-back after adjusting. Once frame 1404 has been robotically adjusted and allowed to cool/set, the see-through display 1402 and additional components are coupled to the frame 1404.

Figure 15:
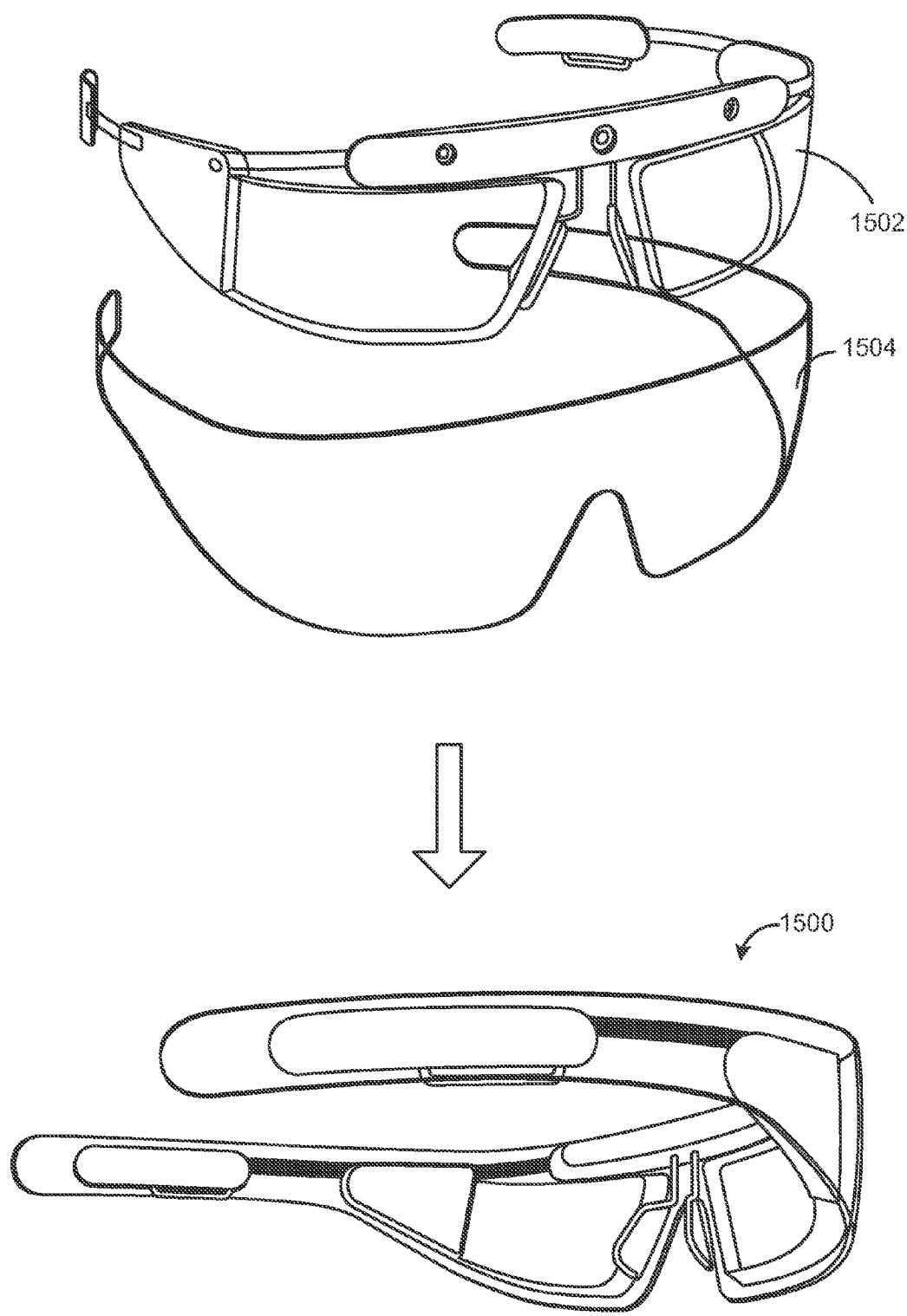

FIG. 15 schematically shows an HMD device 1500 including a modular see-through display 1502 and a customized frame 1504 according to another embodiment of the present disclosure. Frame 1504 is a lens that is configured to substantially encircle a head of the user. Frame 1504 may be selected from a plurality of stock frames produced at high volume by injection molding, thermoforming and CNC trimming, or other such processes. Frame 1504 may then by adjusted to create a modified frame to accommodate the user's fit points. The frame 1504 may be adjusted by heating and then formed robotically or manually to fit the user's head. The see-through display 1502 and other components may then be coupled to the inside of frame 1504 to form HMD device 1500. Due to the increased amount of curvature provided by frame 1504, the mechanism in which the components are mounted to frame 1504 may compensate for additional gaps or other issues presented by the curvature. For example, the components may be coupled to frame 1504 via an adhesive configured to expand and thus hold the components in a desired location while filling in any gaps between the components and frame 1504.

In some embodiments, the above described methods and processes may be tied to a computing system including one or more computers. In particular, such methods and processes may be implemented as a computer application or service, an application-programming interface (API), a library, and/or other computer-program product.

Figure 16:
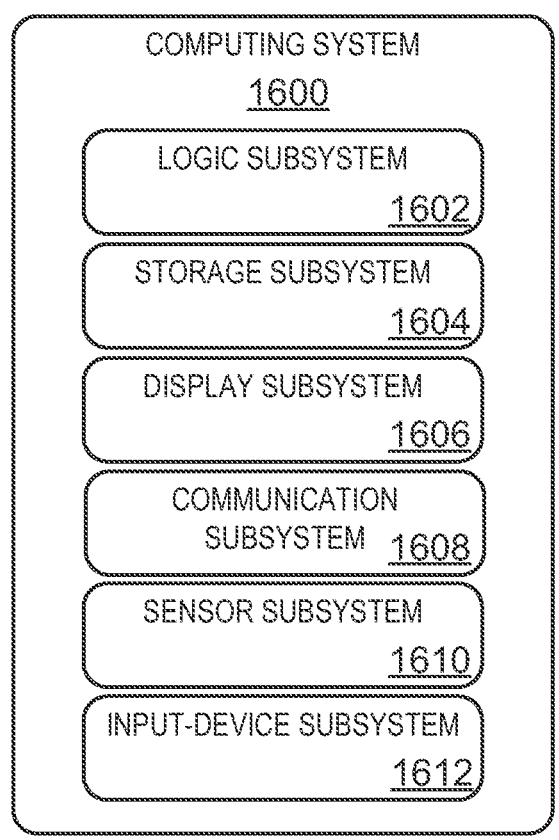
FIG. 16 schematically shows a non-limiting example of a computing system.

FIG. 16 schematically shows a nonlimiting embodiment of a computing system 1600 that can perform one or more of the methods and processes described above. Computing system 1600 may be included as part of an HMD device, such as HMD device 10. Computing system 1600 is one non-limiting example of entertainment system 702. Further, computing system 1600 may be configured to obtain fit points of a user, receive a fit profile of the user, produce a 3-D model of an HMD device customized for the user, and/or control fabrication, assembly, and/or customization of the components of the HMD device. Computing system 1600 is shown in simplified form. It is to be understood that virtually any computer architecture may be used without departing from the scope of this disclosure. In different embodiments, computing system 1600 may take the form of a mainframe computer, server computer, desktop computer, laptop computer, tablet computer, home entertainment computer, network computing device, gaming device, mobile computing device, mobile communication device (e.g., smart phone), etc.

Computing system 1600 includes a logic subsystem 1602 and a storage subsystem 1604. Computing system 1600 may optionally include a display subsystem 1606, input-device subsystem 1612, communication subsystem 1608, and/or other components not shown in FIG. 16. Computing system 1600 may also optionally include or interface with one or more user-input devices such as a keyboard, mouse, game controller, camera, microphone, and/or touch screen, for example. Such user-input devices may form part of input-device subsystem 1612 or may interface with input-device subsystem 1612.

Logic subsystem 1602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 1604 includes one or more physical, non-transitory, devices configured to hold data and/or instructions executable by the logic subsystem to implement the herein-described methods and processes. When such methods and processes are implemented, the state of storage subsystem 1604 may be transformed—e.g., to hold different data.

Storage subsystem 1604 may include removable media and/or built-in devices. Storage subsystem 1604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1604 may include volatile, nonvolatile, dynamic, static, read/write, read-only, random access, sequential access, location-addressable, file-addressable, and/or content-addressable devices. In some embodiments, logic subsystem 1602 and storage subsystem 1604 may be integrated into one or more unitary devices, such as an application-specific integrated circuit (ASIC), or a system-on-a-chip.

It will be appreciated that storage subsystem 1604 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 1600 that is implemented to perform a particular function. In some cases, such a module, program, or engine may be instantiated via logic subsystem 1602 executing instructions held by storage subsystem 1604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It is to be appreciated that a "service", as used herein, is an application program executable across multiple user sessions. A service may be available to one or more system components, programs, and/or other services. In some implementations, a service may run on one or more server-computing devices.

When included, display subsystem 1606 may be used to present a visual representation of data held by storage subsystem 1604. This visual representation may take the form of a graphical user interface (GUI). As the herein described methods and processes change the data held by the storage subsystem, and thus transform the state of the storage subsystem, the state of display subsystem 1606 may likewise be transformed to visually represent changes in the underlying data. Display subsystem 1606 may include one or more display devices utilizing virtually any type of technology. Such display devices may be combined with logic subsystem 1602 and/or storage subsystem 1604 in a shared enclosure, or such display devices may be peripheral display devices.

When included, communication subsystem 1608 may be configured to communicatively couple computing system 1600 with one or more other computing devices. Communication subsystem 1608 may include wired and/or wireless communication devices compatible with one or more different communication protocols. As nonlimiting examples, the communication subsystem may be configured for communication via a wireless telephone network, or a wired or wireless local- or wide-area network. In some embodiments, the communication subsystem may allow computing system 1600 to send and/or receive messages to and/or from other devices via a network such as the Internet.

Sensor subsystem 1610 may include one or more sensors configured to sense different physical phenomenon (e.g., visible light, infrared light, acceleration, orientation, position, etc.), as described above. For example, the sensor subsystem 1610 may comprise one or more image sensors, motion sensors such as accelerometers, touch pads, touch screens, and/or any other suitable sensors. Therefore, sensor subsystem 1610 may be configured to provide observation information to logic subsystem 1602, for example. As described above, observation information such as image data, motion sensor data, and/or any other suitable sensor data may be used to perform such tasks as determining a particular gesture performed by the one or more human subjects.

In some embodiments, sensor subsystem 1610 may include a depth camera (e.g., sensor 18 of FIG. 1 or sensor 706 of FIG. 7). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 1610 may include a visible light camera. Virtually any type of digital camera technology may be used without departing from the scope of this disclosure. As a non-limiting example, the visible light camera may include a charge coupled device image sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display device, comprising:
   a modular frame assembly including one or more different components, each of the different components selected from a component set, the component set including at least two or more differently-sized versions of each different component; and
   a modular see-through display sub-assembly including one or more mountings for selectably coupling the modular see-through display sub-assembly to the modular frame assembly, the modular see-through display sub-assembly configured to couple to any combination of differently-sized versions of different components of the modular frame assembly.

2. The head-mounted display device of claim 1, wherein the modular see-through sub-assembly is coupled to the modular frame assembly via a brow bar, the brow bar coupled to the mountings of the see-through display sub-assembly.

3. The head-mounted display device of claim 1, wherein the modular see-through display assembly is coupled to the modular frame assembly such that exit pupils of the modular see-through display assembly are aligned with pupils of a user when the head-mounted display device is worn by the user.

4. The head-mounted display device of claim 1, wherein the modular see-through display sub-assembly includes a see-through display and a plurality of optical sensors.

5. The head-mounted display device of claim 4, wherein the see-through display comprises a right-eye module and a left-eye module.

6. The head-mounted display device of claim 1, further comprising a control subsystem coupled to the modular frame assembly.

7. The head-mounted display device of claim 1, further comprising a control subsystem coupled to the modular see-through display sub-assembly.

8. The head-mounted display device of claim 1, further comprising an audio subsystem coupled to the modular frame assembly.

9. The head-mounted display device of claim 1, further comprising a plurality of fit components coupled to the modular frame assembly.

10. The head-mounted display device of claim 9, wherein the plurality of fit components comprise a nose pad, a right temple pad and a left temple pad.

11. The head-mounted display device of claim 1, wherein the modular see-through display sub-assembly is selected from a plurality of differently-sized modular see-through display sub-assemblies.

12. A modular component set for a head-mounted display device, comprising:
    a plurality of differently-sized see-through display sub-assemblies, each see-through display sub-assembly including:
       a see-through display; and
       a brow bar coupled to the see-through display and including one or more mountings at a common mount location,
    each brow bar configured to be mounted to any size of a plurality of differently-sized frames via the one or more mountings of the brow bar.

13. The modular component set of claim 12, further comprising an audio subsystem configured to be mounted to any size of the plurality of differently-sized frames.

14. The modular component set of claim 12, wherein each see-through display sub-assembly further comprises a plurality of optical sensors.

15. The modular component set of claim 12, wherein each brow bar is configured to be mounted to any size of the plurality differently-sized frames at a common location on each frame.

16. A method for customizing a head-mounted display device, comprising:
    selecting a modular see-through display that closely accommodates a user fit profile, the modular see-through display selected from a plurality of differently-sized modular see-through displays; and
    coupling the selected modular see-through display to a modular frame that closely accommodates the user fit profile, the modular frame selected from a plurality of differently-sized modular frames.

17. The method of claim 16, wherein coupling the selected modular see-through display to the modular frame further comprises coupling the selected modular see-through display to a brow bar and mounting the brow bar to the modular frame.

18. The method of claim 16, further comprising coupling an audio subsystem to the modular frame.

19. The method of claim 16, further comprising coupling one or more fit components to the modular frame.

20. The method of claim 16, wherein the fit profile of the user comprises an interpupillary distance and one or more fit points, and wherein selecting the modular see-through display that closely accommodates the user fit profile further comprises selecting the modular see-through display such that exit pupils of the modular see-through display are spaced apart by a distance equal to the interpupillary distance when the modular see-through display is coupled to the modular frame.

* * * * *